United States Patent
Morgen

(10) Patent No.: US 6,762,945 B2
(45) Date of Patent: Jul. 13, 2004

(54) METHOD AND SYSTEM FOR PRODUCING A SUPPLY VOLTAGE DURING A FIRST AND SECOND OPERATING MODE

(75) Inventor: Johann Egon Morgen, Pfakofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/265,032

(22) Filed: Oct. 4, 2002

(65) Prior Publication Data

US 2003/0067287 A1 Apr. 10, 2003

(30) Foreign Application Priority Data

Oct. 5, 2001 (DE) ........................................ 101 49 282

(51) Int. Cl.⁷ .......................................... H02M 3/335
(52) U.S. Cl. .............................. 363/17; 363/98; 363/16
(58) Field of Search .............................. 363/15, 16, 17, 363/97, 98

(56) References Cited

U.S. PATENT DOCUMENTS 4,692,671 A * 9/1987 Dishner et al. ................ 318/11
4,695,776 A * 9/1987 Dishner et al. ................ 318/14
5,883,496 A * 3/1999 Esaki et al. .................. 320/132

FOREIGN PATENT DOCUMENTS

| EP | 0 805 549 A1 | * | 5/1997 | ............. H02J/7/00 |
| EP | 0805540 A1 | | 11/1997 | ............. H02J/7/00 |
| JP | 05038138 A | | 2/1993 | .......... H02M/3/155 |

* cited by examiner

Primary Examiner—Bao Q. Vu
(74) Attorney, Agent, or Firm—Baker Botts L.L.P.

(57) ABSTRACT

The invention relates to a method for producing a supply voltage, in particular for digital circuits, in a motor vehicle from a relatively high input voltage of more than 12 volts, in particular from a vehicle power supply system voltage of 42 volts, in which an intermediate voltage at a level between the vehicle power supply system voltage and the supply voltage is produced from the vehicle power supply system voltage in a normal mode by means of a DC/DC converter (5), and the supply voltage is produced from the intermediate voltage by means of at least one linear regulator (9, 9', 9"), in which the DC/DC converter (5) is switched off and is bridged by means of a bypass circuit (11) in a parking mode, so that the supply voltage is produced directly by the at least one linear regulator (9, 9', 9"), and to a voltage supply circuit for this purpose.

26 Claims, 3 Drawing Sheets

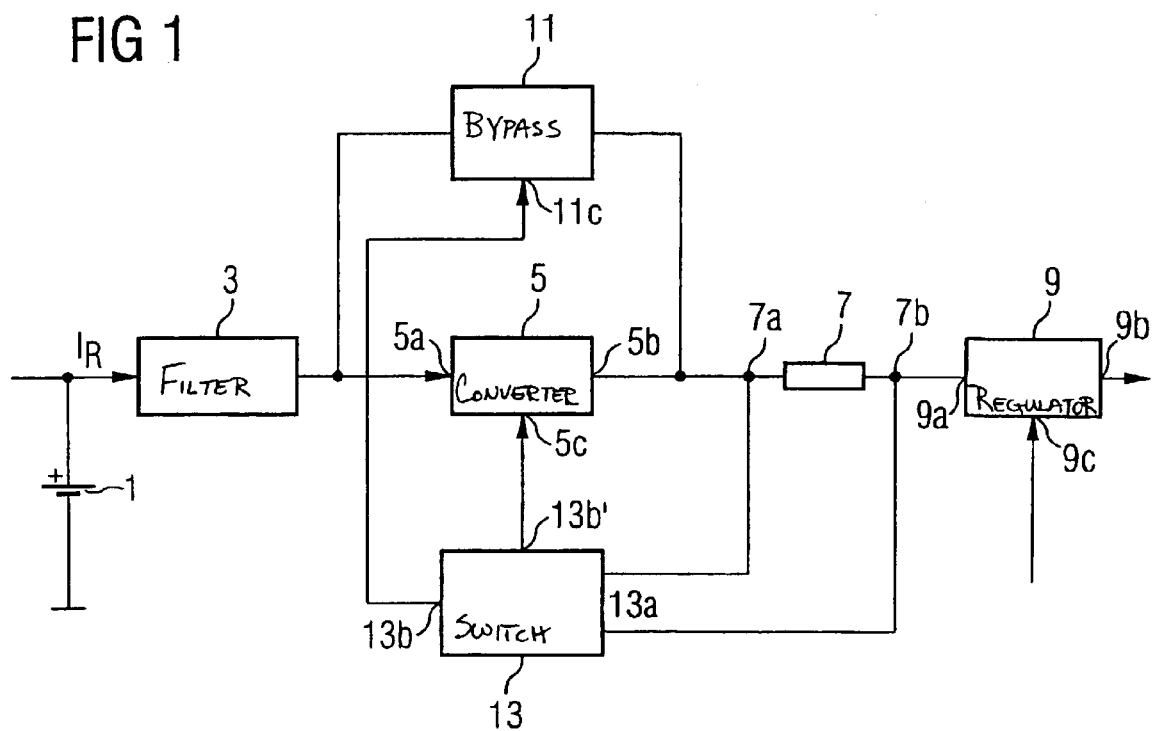

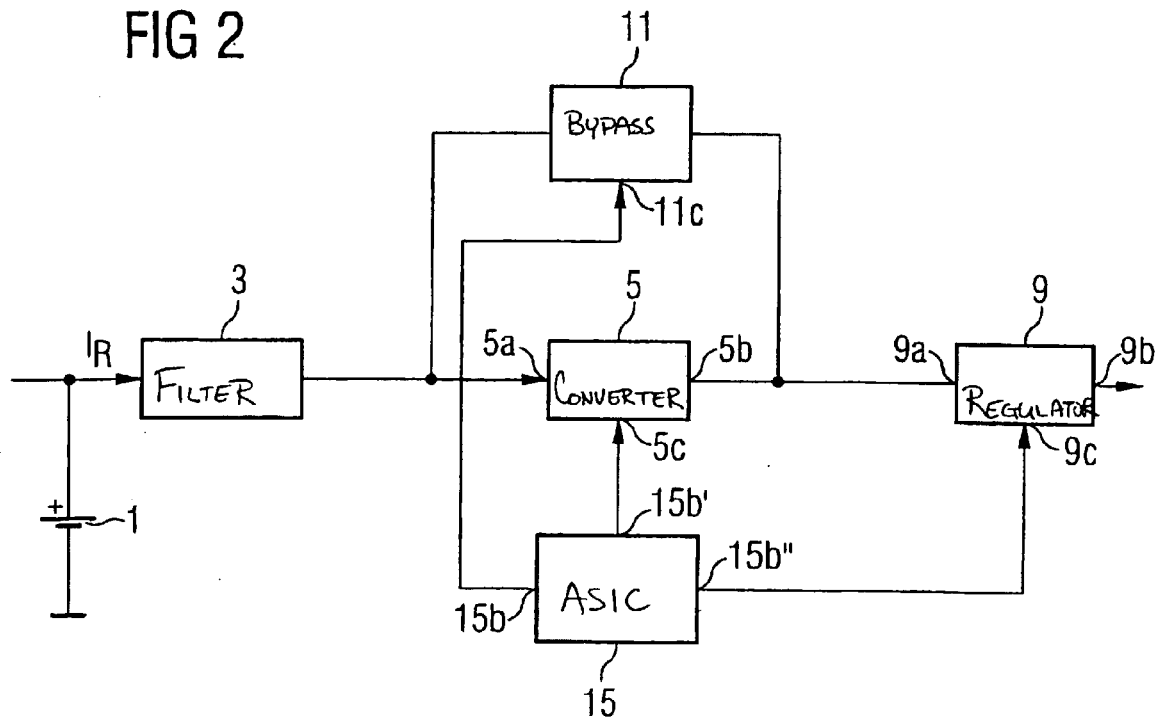
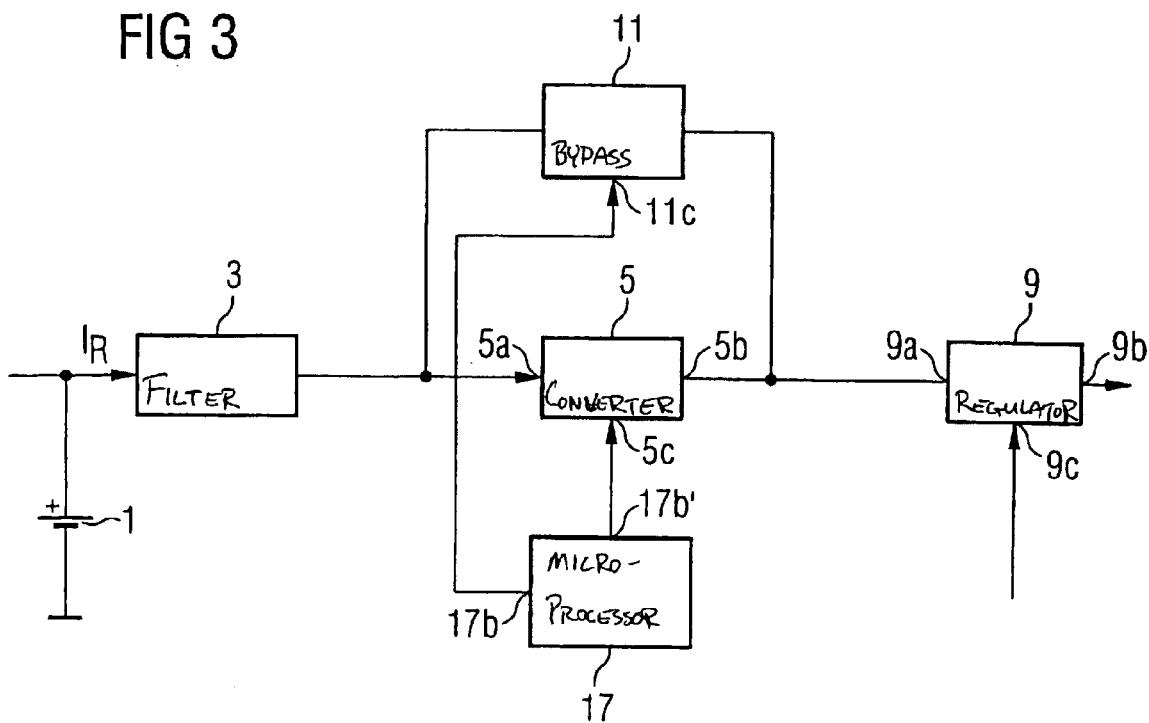

METHOD AND SYSTEM FOR PRODUCING A SUPPLY VOLTAGE DURING A FIRST AND SECOND OPERATING MODE

BACKGROUND OF THE INVENTION

The invention relates to a method and to a voltage supply circuit for producing a supply voltage from a relatively high supply voltage.

Voltage supply circuits and voltage or current supply modules such as these are used, for example, in vehicle technology.

The change in the vehicle power supply system voltage from 12 volts to 42 volts in future passenger vehicles and at the same time a requirement for a supply voltage for controllers, that is to say using digital circuit technology, at a known voltage of, for example, 5 volts, 3.3 volts or else 2.5 volts, is resulting in a number of problems.

By way of example, the linear fixed voltage regulators which are used in a 12 volt vehicle power supply system architecture for producing a previously normal supply voltage of 5 volts cannot be used owing to the considerably greater voltage difference that will occur in future passenger vehicles and the power loss that this will result in the linear regulator, since it will then no longer be possible to use these without additional cooling measures which, disadvantageously, would result in considerable additional costs. It is likewise impossible, for cost reasons, to use specific, expensive linear regulators optimized for this purpose.

A further requirement in vehicle technology is that some digital circuits or controllers, for example the controller which is responsible for central locking, remote control etc., need to operate in a daytime mode as well, in which the vehicle is in some circumstances parked for a lengthy time. This situation is taken into account by means of a standby mode for some controllers which have to remain active at least cyclically, while other controllers, which are not required, are switched off completely. The standby current in an operating mode (parking mode) such as this is in the $\mu A$ range, for example about 100 $\mu A$, in contrast to a normal mode in the mA range, for example about 200 mA.

In order to reduce the thermal power loss in linear regulators, EP 0 805 540 A1 therefore proposes that a DC/DC converter be connected upstream of the linear regulators, in this way reducing the current consumption from the battery as well as the (thermal) power loss.

However, this circuit (which is used in a conventional 12 volt vehicle power supply system architecture) still has the disadvantage when used in a vehicle power supply system with a higher voltage, such as 42 volts, in that, in consequence, it is no longer possible to satisfy the standby current requirement in a parking mode, at least without using undesirable costly special components or cooling measures.

SUMMARY OF THE INVENTION

The present invention is therefore based on the object of providing a method for producing a supply voltage as well as a voltage supply circuit for carrying out such a method, which methods also satisfy the standby current requirement in a parking mode or standby mode in a cost-effective and simple manner.

According to the invention, this object is achieved by a method for producing a supply voltage, in particular for digital circuits, in a motor vehicle from a relatively high input voltage of more than 12 volts, in particular from a vehicle power supply system voltage of 42 volts, a) in which an intermediate voltage at a level between the vehicle power supply system voltage and the supply voltage is produced from the vehicle power supply system voltage in a normal mode by means of a DC/DC converter, and b) the supply voltage is produced from the intermediate voltage by means of at least one linear regulator, wherein c) the DC/DC converter is switched off and is bridged by means of a bypass circuit in a parking mode, so that the supply voltage is produced directly by the at least one linear regulator.

The object can further be achieved by another method for producing a supply voltage during a first and second operation mode from a relatively high input voltage comprises the steps of:

a) during the first operation mode:
generating an intermediate voltage at a level between the high input voltage and the supply voltage from the high input voltage in a normal mode by means of a first converter, and
generating the supply voltage from the intermediate voltage by means of at least a second converter, b) during the second operation mode:
switching off the first converter and bridging the first converter by means of a bypass circuit, so that the supply voltage is produced directly by the at least one second converter.

One embodiment is a voltage supply circuit having at least one linear regulator and having a DC/DC converter which is connected upstream of the at least one linear regulator, in order to produce a relatively low supply voltage, in particular for digital circuits, via an intermediate voltage from a voltage of more than 12 volts, in particular from a vehicle power supply system voltage of 42 volts, characterized in that the voltage supply circuit has a bypass circuit in order to bridge the converter in a parking mode.

Yet another embodiment is a voltage supply circuit having two operation modes comprising:
a first converter receiving a high supply voltage generating an intermediate voltage;
a second converter receiving the intermediate voltage for generating a supply voltage;
a control circuit for either turning on the first converter or for turning off the converter and feeding the high supply voltage directly to the second converter.

The control circuit may comprise a bypass circuit for bridging said first converter and may further comprises a current sensor for sensing the output current of the first converter to switch from the first to the second operation mode. The first converter can be a DC/DC converter and the second converter can be a linear regulator.

Since, according to the invention, the supply voltage or output voltage for digital circuits, in particular at a level of 5 volts, 3.3 volts, 2.5 volts or less, is produced solely by one or more linear regulators in a standby mode, the requirement for a very low standby current in the $\mu A$ range can be satisfied, since the power loss in a linear regulator remains with a low supply current in the $\mu A$ range even when there is a relatively large voltage difference between the input and output or supply voltage, and hence only insignificantly increases the standby current, which is already produced or consumed by the controller in the standby mode, to an overall standby current.

According to the invention, this is achieved by bridging, for example by means of a bypass circuit and in particular bypass transistor, the converter which is connected upstream of the linear regulator or the linear regulators, in which case the converter can advantageously be switched off in this mode, in order to further reduce the current consumption.

A wide range of different implementation options may be used for bridging the converter and for switching it off and on, for example coupling to the ignition lock or to a controller which is responsible for this, or coupling it to other events which may possibly be linked to one another and by means of which it is possible to distinguish between a standby or parking mode and a normal mode.

In one embodiment of the invention, the activation as well as the deactivation of the bypass, and, possibly, additionally the associated switching on and off of the converter, are carried out by means of a load current threshold value switch, which switches the converter on and the bypass off when the load current in the output or supply circuit, or a value which is proportional to this—for example a load current threshold value in the intermediate circuit or side circuits from it—exceeds a predefined threshold value, and switches the bypass on and the converter off when the threshold value (parking mode) is undershot.

In another embodiment of the invention, the bypass and the converter are controlled by a microcontroller to which events such as "controller switching to the standby mode", "engine switched off", "current regulator between the battery and the generator switched to battery mode" etc. are supplied as a signal, so that the control of the bypass and of the converter is dependent on one event on its own or in a specific combination (by means of appropriate software).

In the preferred embodiment according to the invention, this control function is carried out by means of a wake-up ASIC, which can carry out the same tasks in the same way as described above for the microcontroller but, in contrast to the microcontroller or microprocessor, depends directly on the vehicle power supply system voltage instead of on the supply voltage of the voltage module in the standby mode and, in consequence, can provide a standby mode even when not only the converter but also the linear regulators are completely switched off.

In the preferred embodiment according to the invention, different supply voltages can be produced by means of a number of linear regulators from the intermediate voltage which is produced by the converter in order, for example, to appropriately supply different circuit groups of a controller with different input voltages. In this case, the linear regulators may be followed by a logic circuit, which monitors the output voltages and/or supply voltages and produces a reset signal when a specific error or fault occurs, and switches off one or all of the output voltages depending on the requirements of the microcontroller that is used. Further advantageous refinements of the invention can be found in the dependent claims.

BRIEF DESCRIPTION OF THE DRAWINGS

The invention will be explained in more detail in the following text using the exemplary embodiments which are illustrated in the drawing. In the drawing:

FIG. 1 shows a diagram of a first embodiment of a voltage supply circuit according to the invention;

FIG. 2 shows a diagram of a second embodiment of a voltage supply circuit according to the invention;

FIG. 3 shows a diagram of a third embodiment of a voltage supply circuit according to the invention.

DETAILED DESCRIPTION OF THE PREFERRED EMBODIMENTS

Figure 4:
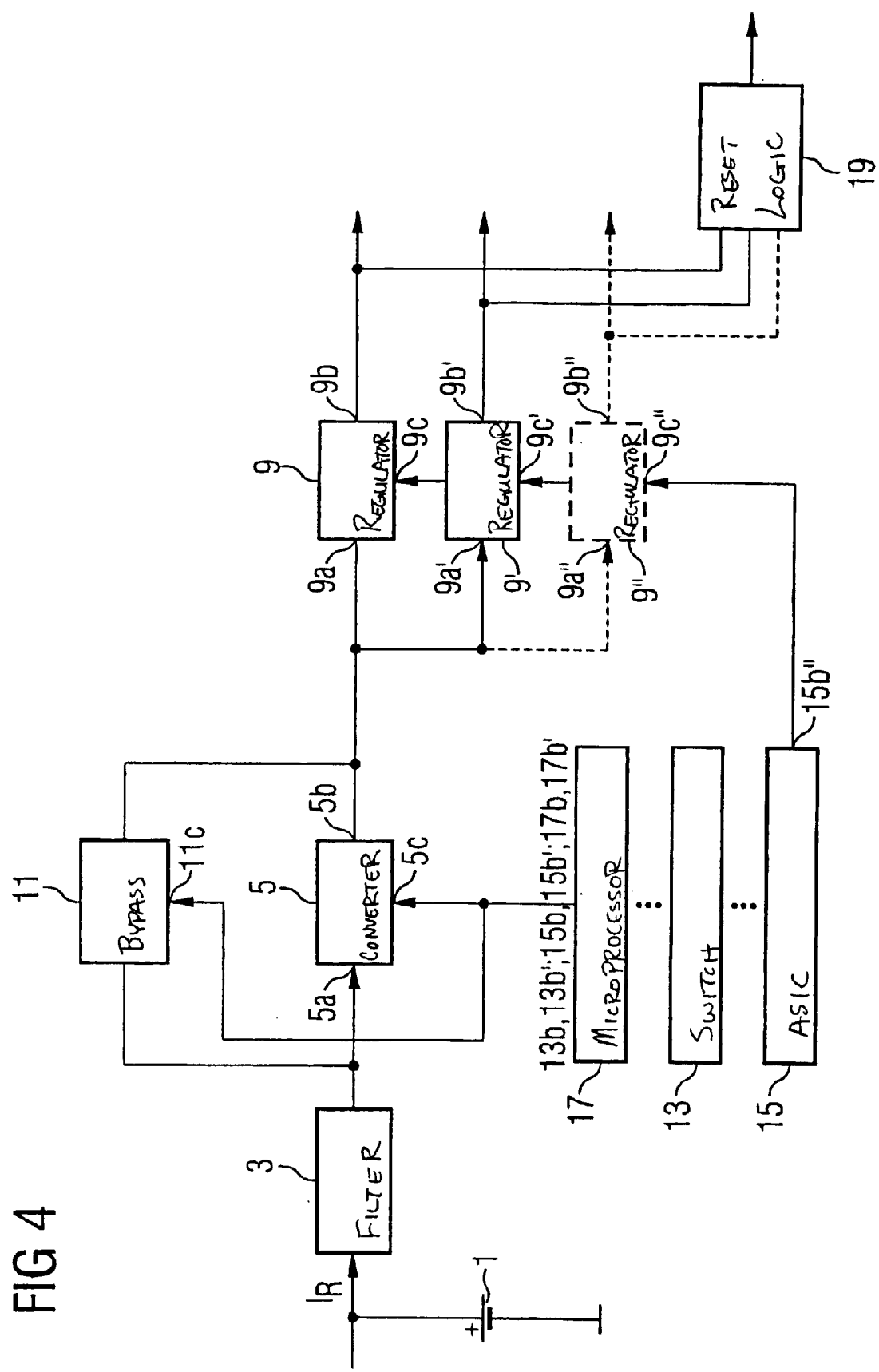
FIG. 4 shows a diagram of the embodiments of a voltage supply circuit as shown in FIGS. 1, 2 and 3 with a downstream reset logic unit.

The voltage supply circuit which is illustrated in FIG. 1 and which, of course, may also be in the form of a current supply circuit has a battery 1, for example a car battery, which supplies a voltage of 36 volts, in which case, as is normal in a motor vehicle, the connection processes and regulation processes between the battery voltage or battery supply and the supply from the generator are normally carried out by means of a regulator, which is not shown in any more detail in the drawing.

A downstream EMC filter 3 is used to filter conducting interference out of the resultant voltage or the current $I_R$ that flows, and this voltage or current is supplied to a downstream direct current converter 5, referred to as a DC/DC converter in the following text.

The output side of the DC/DC converter 5 is connected via a measurement resistor (shunt) 7 to the input 9a of a linear fixed voltage regulator 9, referred to as a linear regulator in the following text, at whose output 9b the desired supply voltage is produced for a digital circuit, for example a controller in a motor vehicle, at the appropriate level of, for example, 5 volts, 3.3 volts, 2.5 volts etc.

As can be seen from FIG. 1, the input 5a and output 5b of the DC/DC converter 5 are connected via a bypass circuit 11 which can be switched on and off. The control and the switching on and off of the bypass 11, as well as the switching on and off of the DC/DC converter 5, are in this exemplary embodiment carried out by means of a current threshold value switch 13, which is connected on the output side (13b, 13b') to the switching or control inputs 11c, 5c of the bypass circuit 11 and of the DC/DC converter 5 and which, on the input side (13a), taps off the measurement voltage which is produced across the shunt 7.

Furthermore, a control input 9c for switching the linear regulator on and off is indicated on the linear regulator 9, via which control input 9c, when specific errors or faults occur, the supply voltage can be switched off, by switching off the linear regulator, via an appropriate control signal from a microcontroller, for example via the microcontroller for the controller.

When the circuit shown in FIG. 1 is in the normal mode, the bypass circuit and the bypass switch 11 are switched off and, in consequence, the DC/DC converter 5 is not bridged. Furthermore, the switched-on DC/DC converter 5 produces an intermediate (circuit) voltage, which is applied to the input 9a of the linear regulator 9, and from which the supply voltage is produced at the output 9b of the linear regulator.

If a controller which is not shown in the drawing but which is connected to this output now changes from a normal mode with a current consumption in the mA range, for example 200 mA, to a standby mode, then the current on the output side of the voltage supply circuit falls to the correspondingly required standby current for the controller in the μA range, for example 100 μA. This current drop is detected by the current threshold value switch via the taps 7a, 7b on the shunt 7 whereupon, if a predefined threshold value is undershot that is at the level between the current in the normal mode and the standby mode, for example 5 mA, the bypass circuit 11 is switched on, and the DC/DC converter 5 is, in addition, switched off.

In this mode with a low current consumption, this measure results in the required output voltage or supply voltage with a low standby current being produced by bridging the DC/DC converter 5 solely by the linear regulator 9, which does not require any additional cooling for this low current consumption. Switching off the DC/DC converter 5, which, when on no load, has a current consumption which is 10 times higher than that of a linear regulator, results in a considerably smaller standby current component through the voltage supply circuit, so that the standby current requirement, with which the battery is loaded in the parking mode when the generator is not running, can be satisfied.

This means that, even after the vehicle has been stationary for several days or weeks, the small discharge from the battery resulting from the reduced standby current ensures that a controller, which in this mode needs to be active at least cyclically, still operates, for example for the central locking, door opening, remote control etc.

The circuits in FIG. 2 and FIG. 3 differ from the circuit shown in FIG. 1 only by the use of a different control device, namely the use of a microcontroller 17 or of a wake-up ASIC 15 instead of a current threshold value switch 13. In this case, both the microcontroller 17 and the wake-up ASIC 15 are supplied via inputs, which are not illustrated, with one or more signals, so that events with signals in the form such as "door opening", "pressing of remote control", "operation of the cylinder lock", "status of the regulator between the generator and the battery" etc. are provided there, from which it is possible to deduce differences between the normal mode and the standby mode or parking mode of a vehicle on their own or in a specific combination with one another.

If the microcontroller 17 or the wake-up ASIC 15 decides that a change has taken place from one state to the other, it switches, in the same way as that described above for the threshold value switch 13, the bypass switch 11 on via the output 17b or 15b, and switches the DC/DC converter 5 off via the output 17b' or 15b' (parking mode), or switches the bypass switch 11 off and the DC/DC converter on (normal mode).

As shown in FIG. 2, in the embodiment with a wake-up ASIC 15 as the control device, the linear regulator 9 can also be switched off via the output 15b" in the standby mode, since, in contrast to the microcontroller 17 or the current value switch 13, the wake-up ASIC 15 draws its operating voltage directly from the vehicle power supply system, that is to say from the battery and generator, and in consequence does not require any output voltage at all from the linear regulator 9.

FIG. 4 firstly shows the above different embodiments with the current threshold value switch 13, the microprocessor 17 and the wake-up ASIC 15, in this case showing the capability for not only one linear regulator 9 but for a number of linear regulators (for example three) 9, 9', 9" to be connected downstream from the converter, which use an intermediate circuit voltage from the converter 5 to produce different output voltages, for example for different circuit groups of a controller.

For operational reliability purposes, these outputs 9b, 9b', 9b" may also be connected via a reset logic circuit 19 to a microcontroller (for example to the microcontroller of the controller) so that, when specific faults or errors occur, the output voltage or supply voltage from one or more linear regulators 9, 9', 9" can be switched off, for example by switching off the appropriate linear regulator 9, 9', 9" or by switching off the entire circuit, by switching off the bypass switch 11 and switching off the converter 15.

The embodiments explained above indicate how a supply voltage for digital circuits, in particular 5 volts, 3.3 volts or 2.5 volts, can be produced from a future vehicle power supply system voltage of more than 12 volts, for example 42 volts, with the standby current requirement for a long-term parking mode (standby mode) nevertheless being satisfied, without using any special costly components or cooling measures.

An input voltage of 42 volts and a battery voltage of 36 volts should, of course, be regarded only as absolute values, although it should be expressly mentioned that normal voltages in a 42 volt vehicle power supply system may be within a (tolerance) band of between 18 volts and 58 volts, even without considering electromagnetic compatibility.

The circuit according to the invention and the method according to the invention may, of course, be used not only in vehicle technology but also in any desired fields in which there is a requirement for a particularly low current consumption in the standby mode, for example owing to an autonomous power supply or for cost reasons. As illustrated in FIG. 4, different output voltages can be produced in each of the embodiments by using an appropriate number of different linear regulators, so that the desired supply voltage can be produced depending on the requirements (required input voltage for the appliances to be operated, in particular controllers). The total of three linear regulators illustrated in the exemplary embodiment should, of course, be regarded as being only by way of example, so that the DC/DC converter may be followed by any desired number of linear regulators.

What is claimed is:

1. A method for producing a supply voltage, in particular for digital circuits, in a motor vehicle from a relatively high input voltage of more than 12 volts, in particular from a vehicle power supply system voltage of 42 volts, a) in which an intermediate voltage at a level between the vehicle power supply system voltage and the supply voltage is produced from the vehicle power supply system voltage in a normal mode by means of a DC/DC converter, and b) the supply voltage is produced from the intermediate voltage by means of at least one linear regulator, wherein c) the DC/DC converter is switched off and is bridged by means of a bypass circuit in a parking mode, so that the supply voltage is produced directly by the at least one linear regulator.

2. The method as claimed in claim 1, wherein a control device is used for switching between the normal mode and the parking mode, as a function of the load current flowing on the supply voltage side.

3. The method as claimed in one of claims 1, wherein different supply voltages are produced by using a number of linear regulators.

4. A voltage supply circuit having at least one linear regulator and having a DC/DC converter which is connected upstream of the at least one linear regulator, in order to produce a relatively low supply voltage, in particular for digital circuits, via an intermediate voltage from a voltage of more than 12 volts, in particular from a vehicle power supply system voltage of 42 volts, characterized in that the voltage supply circuit has a bypass circuit in order to bridge the converter in a parking mode.

5. The voltage supply circuit as claimed in claim 4, wherein the DC/DC converter is designed to be controllable, in order to be switched on when the bypass circuit is switched off, and to be switched off when the bypass circuit is switched on.

6. The voltage supply circuit as claimed in claim 5, wherein the voltage supply circuit has a control device in order to control the bypass circuit and, preferably, also the DC/DC converter as a function of the load current flowing on the supply voltage side.

7. The voltage supply circuit as claimed in claim 6, wherein the control device is in the form of a current threshold value switch.

8. The voltage supply circuit as claimed in claim 6, wherein the control device is in the form of a microcontroller.

9. The voltage supply circuit as claimed in claim 6, wherein the control device is in the form of a wake-up ASIC.

10. The voltage supply circuit as claimed in claim 4, wherein the at least one linear regulator has a reset output, which emits a reset signal when a voltage threshold value is undershot.

11. A method for producing a supply voltage during a first and second operation mode from a relatively high input voltage comprising the steps of:
a) during the first operation mode:
generating an intermediate voltage at a level between the high input voltage and the supply voltage from the high input voltage in a normal mode by means of a first converter, and
generating the supply voltage from the intermediate voltage by means of at least a second converter,
b) during the second operation mode:
switching off the first converter and bridging the first converter by means of a bypass circuit, so that the supply voltage is produced directly by the at least one second converter.

12. The method as claimed in claim 11, wherein the first converter is a DC/DC converter and the second converter is a linear regulator.

13. The method as claimed in claim 11, wherein the method is used within a vehicle and the first operation mode is a normal mode and the second operation mode is a parking mode.

14. The method as claimed in claim 11, wherein a control device is used for switching between the first operation mode and the second operation mode, as a function of the load current flowing on the supply voltage side.

15. The method as claimed in claim 11, wherein the high input voltage is approximately 42 volts and the intermediate voltage is approximately 12 volts.

16. The method as claimed in one of claims 11, wherein different supply voltages are produced by using a plurality of second converters.

17. A voltage supply circuit having two operation modes comprising:
a first converter receiving a high supply voltage generating an intermediate voltage;
a second converter receiving said intermediate voltage for generating a supply voltage;
a control circuit for either turning on said first converter or for turning off said converter and feeding said high supply voltage directly to said second converter.

18. Circuit as in claim 17, wherein the control circuit comprises a bypass circuit for bridging said first converter.

19. Circuit as in claim 17, wherein the control circuit further comprises a current sensor for sensing the output current of said first converter to switch from said first to said second operation mode.

20. Circuit as in claim 18, wherein the first converter is a DC/DC converter and the second converter is a linear regulator.

21. Circuit as claimed in claim 20, wherein the DC/DC converter is designed to be controllable, in order to be switched on when the bypass circuit is switched off, and to be switched off when the bypass circuit is switched on.

22. Circuit as claimed in claim 21, wherein the voltage supply circuit has a control device in order to control the bypass circuit and, preferably, also the DC/DC converter as a function of the load current flowing on the supply voltage side.

23. Circuit as claimed in claim 22, wherein the control device is in the form of a current threshold value switch.

24. Circuit as claimed in claim 22, wherein the control device is in the form of a microcontroller.

25. Circuit as claimed in claim 22, wherein the control device is in the form of a wake-up ASIC.

26. Circuit as claimed in claim 20, wherein the at least one linear regulator has a reset output, which emits a reset signal when a voltage threshold value is undershot.

* * * * *